US007878899B2

(12) United States Patent
Duhamel et al.

(10) Patent No.: US 7,878,899 B2
(45) Date of Patent: Feb. 1, 2011

(54) METHOD AND SYSTEM FOR PROVIDING A TOURNAMENT HANDICAP FEATURE

(75) Inventors: Gërald Duhamel, Drummondville (CA); Marie-Claude Gagnon, Drummondville (CA); Martin Roy, Drummondville (CA)

(73) Assignee: Labtronix Concept inc., Drummondville, QC ( * ) Notice: Subject to any disclaimer, the term of this patent is extended or adjusted under 35 U.S.C. 154(b) by 1086 days.

(21) Appl. No.: 11/192,242

(22) Filed: Jul. 29, 2005

(65) Prior Publication Data

US 2006/0030960 A1 Feb. 9, 2006

Related U.S. Application Data

(60) Provisional application No. 60/599,024, filed on Aug. 6, 2004.

(51) Int. Cl.
*A63F 13/00* (2006.01)

(52) U.S. Cl. .......................................... 463/23; 463/21

(58) Field of Classification Search ................... 463/16, 463/17, 29, 20, 21, 23
See application file for complete search history.

(56) References Cited

U.S. PATENT DOCUMENTS 5,083,271 A 1/1992 Thacher
5,755,621 A * 5/1998 Marks et al. .................. 463/42
5,762,522 A 6/1998 Robinson
5,779,549 A * 7/1998 Walker et al. ................. 463/42
5,917,725 A 6/1999 Thacher
6,082,887 A 7/2000 Feuer
6,287,202 B1 * 9/2001 Pascal et al. .................. 463/42
6,293,865 B1 9/2001 Kelly
6,817,948 B2 11/2004 Pascal
6,964,416 B2 11/2005 McClintic et al.
7,097,562 B2 8/2006 Gagner
7,362,862 B2 * 4/2008 Schneier et al. ............. 380/251
2002/0072412 A1 6/2002 Young et al.
2003/0060264 A1 * 3/2003 Chilton et al. ................ 463/20
2003/0109306 A1 * 6/2003 Karmarkar .................. 463/40
2004/0033831 A1 2/2004 Tarantino
2004/0106448 A1 6/2004 Gauselmann
2004/0225387 A1 11/2004 Smith
2004/0259620 A1 12/2004 Roy
2005/0020340 A1 1/2005 Cannon
2005/0020352 A1 1/2005 Chilton (Continued)

FOREIGN PATENT DOCUMENTS

CA 2340562 8/2002

(Continued)

*Primary Examiner*—James S McClellan
(74) *Attorney, Agent, or Firm*—Benôit & Coté, s.e.n.c.

(57) ABSTRACT

A tournament feature is herein disclosed. In an embodiment, a method of providing the tournament feature comprises receiving a tournament participation authorization for a player to participate in said tournament feature; assigning a handicap to a tournament participation in said tournament feature; providing said player on one game machine with said tournament participation comprising a tournament play sequence depending on which a tournament score is obtained; storing said score in storing means with a plurality of scores throughout conduct of said tournament feature; evaluating stored scores upon or after detection of the conduct of said tournament feature having ended to establish a winning score and a winning player who obtained said winning score; and awarding a prize to said winning player.

51 Claims, 7 Drawing Sheets

U.S. PATENT DOCUMENTS

| | | | |
|---|---|---|---|
| 2005/0043088 | A1 | 2/2005 | Nguyen |
| 2005/0043089 | A1 | 2/2005 | Nguyen |
| 2005/0208989 | A1 | 9/2005 | Kane et al. |
| 2005/0071024 | A1 | 11/2005 | McClintic et al. |
| 2005/0250571 | A1 | 11/2005 | Kane |
| 2006/0025197 | A1 | 2/2006 | Kane |
| 2006/0082056 | A1 | 4/2006 | Kane |

FOREIGN PATENT DOCUMENTS

| | | |
|---|---|---|
| WO | WO-01/33478 | 5/2001 |

* cited by examiner

METHOD AND SYSTEM FOR PROVIDING A TOURNAMENT HANDICAP FEATURE

CROSS-REFERENCE TO RELATED APPLICATIONS

This application claims priority under 35USC§119(e) of U.S. provisional patent application 60/599,024, filed Aug. 6, 2004, the specification of which is hereby incorporated by reference.

TECHNICAL FIELD

The invention relates to a method and system for providing a tournament feature.

BACKGROUND OF THE INVENTION

The field of casino-style games and gaming machines is in constant evolution. Players are always demanding new characteristics or new applications of these characteristics that may provide them novel excitement. While the variety of games has increased, players and game designers are still craving for novelty.

Accordingly, improvements in this field are desired.

SUMMARY OF THE INVENTION

One embodiment of the invention may be described as a method of providing a tournament feature on a game machine in which, upon or after ending of the conduct of the tournament feature, scores resulting from participations are evaluated to establish a winning score. The player who obtained the winning score is awarded a prize. The method comprises receiving a tournament participation authorization for a player participate in the tournament feature. It further comprises assigning a handicap to this participation, and conducting a tournament play sequence illustrating said participation resulting in a score.

In another embodiment, a game machine is adapted to provide participations in a tournament feature. The gaming machine comprises displaying means, inputting means, and storing means. The gaming machine further comprises controlling means responsible for providing tournament participations being assigned handicaps upon detection of invitations. The participations comprise conducting tournament play sequences resulting in scores stored as participations in the tournament feature.

As another embodiment of the invention, a description of a method of providing a tournament feature is provided. The tournament feature results in a winner being awarded a prize based on scores resulting from participations in the tournament feature. The method comprises storing scores obtained on game machines providing tournament participations upon detection of invitations, and assigning handicaps to these participations. Tournament participations comprise conducting tournament play sequences each resulting in a score. The method further comprises to determine a winner based on the tournament participation scores upon or after the end of the tournament feature.

Another embodiment of the invention is a tournament server adapted for a tournament feature. The tournament server comprises communication means exchanging data with game machines adapted to provide participations assigned handicaps in the tournament feature upon detection of invitations; storing means for storing scores resulting from these participations in the tournament feature; and controlling means controlling the server-related processes related to conduct of the tournament feature comprising the determination of a tournament feature winner.

Another embodiment of the invention may be described as a method of providing a tournament feature with participations being assigned handicaps. The method comprises generating tournament participation authorizations; and assigning handicap to these participation authorizations. The method further comprises providing these participation authorizations in to a game machine, which accordingly can provide a tournament participation to a player.

Another embodiment of the invention may be described as a method of providing a tournament feature on a game machine. At the end of the feature, a player I awarded a prize based on scores obtained and stored throughout the feature. The method comprises receiving tournament participation authorizations; assigning handicaps to these participations, and providing players with these participations on game machines according to these authorizations.

Yet, an embodiment of the invention may be described as computer codes, suitably stored or carried, that are adapted to provide a tournament feature wherein participations are assigned handicaps, the tournament feature resulting in a winner being awarded a prize based on these participations. The computer codes are adapted for at least one of:

- receiving tournament authorizations for players to participate in the tournament feature; assigning handicaps to theses participations; and providing the players with these participations comprising conducting play sequences illustrating these participations and resulting in scores;
- storing stores obtained on a game machine conducting tournament participations; and determining a winner in the tournament feature based on the stored scores at the end of the tournament feature; and
- generating tournament participation authorizations; assigning handicaps to these participation authorizations; and providing game machines with these authorizations, resulting in players participating in the tournament feature.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

Lexicon

In this specification, the terms "game outcome" mean "the result of a play of a game, which is evaluated in comparison with criteria to determine an outcome value". Examples of such game outcomes comprise a card combination resulting from a poker game play, or the game indicia displayed once the reels stopped in a line game.

The term "invitation" means "a tournament feature participation offer". This invitation may either or not be refused, and is usually provided as a signal or a state change.

The terms "eligible" or "eligibility" mean "a state in which something or someone is qualified to be chosen". Thus, in an embodiment of the invention only eligible gaming machines may initiate tournament participations.

The term "asynchronous" means "capable of being non-concurrent" or "being not strictly synchronous". Accordingly, an asynchronous participation in the present tournament feature may or may not take place at the same time, but however it can take place at different times.

The term "activity" means either one of "the state of being active" and "the different functions that may be operated". Therefore, gaming machine activity would comprise for instance the gaming machine being operated by a player, the credit information received in the gaming machine, the amount played, and the outcomes occurring on the gaming machine.

The term "identifier" means "some method, means or information suitable for associating someone to something in an individual manner". The method or information used may take many formats, for instance data format, an electronic format, or a physical format.

The term "handicap" for its part means "an advantage given or a disadvantage imposed". Handicaps are assigned to tournament participations. These handicaps may take many forms as described below.

DETAILED DESCRIPTION OF THE INVENTION

Figure 1:
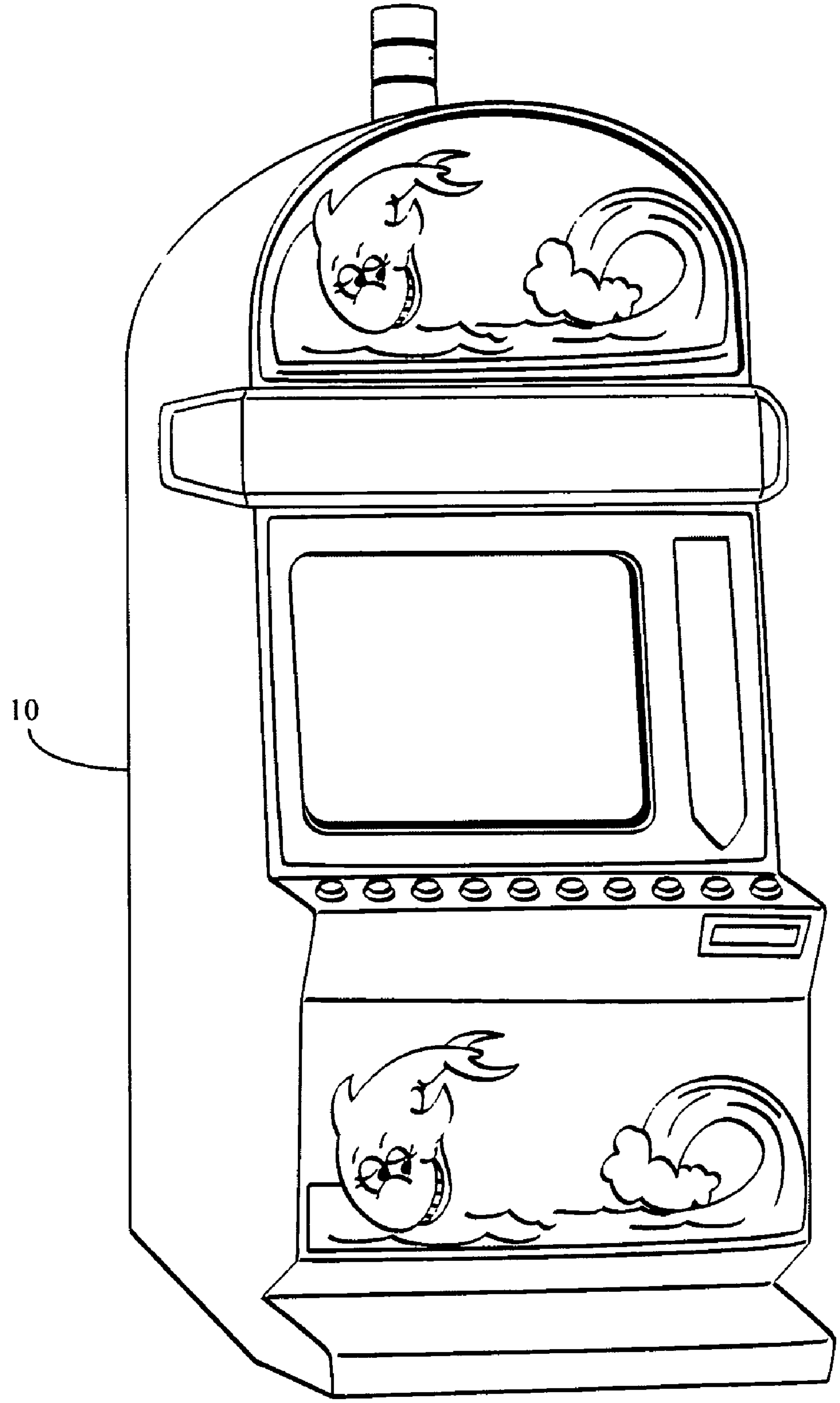
FIG. 1 is a schematic diagram showing a perspective view of a gaming machine suitable for the present invention.
Figure 2:
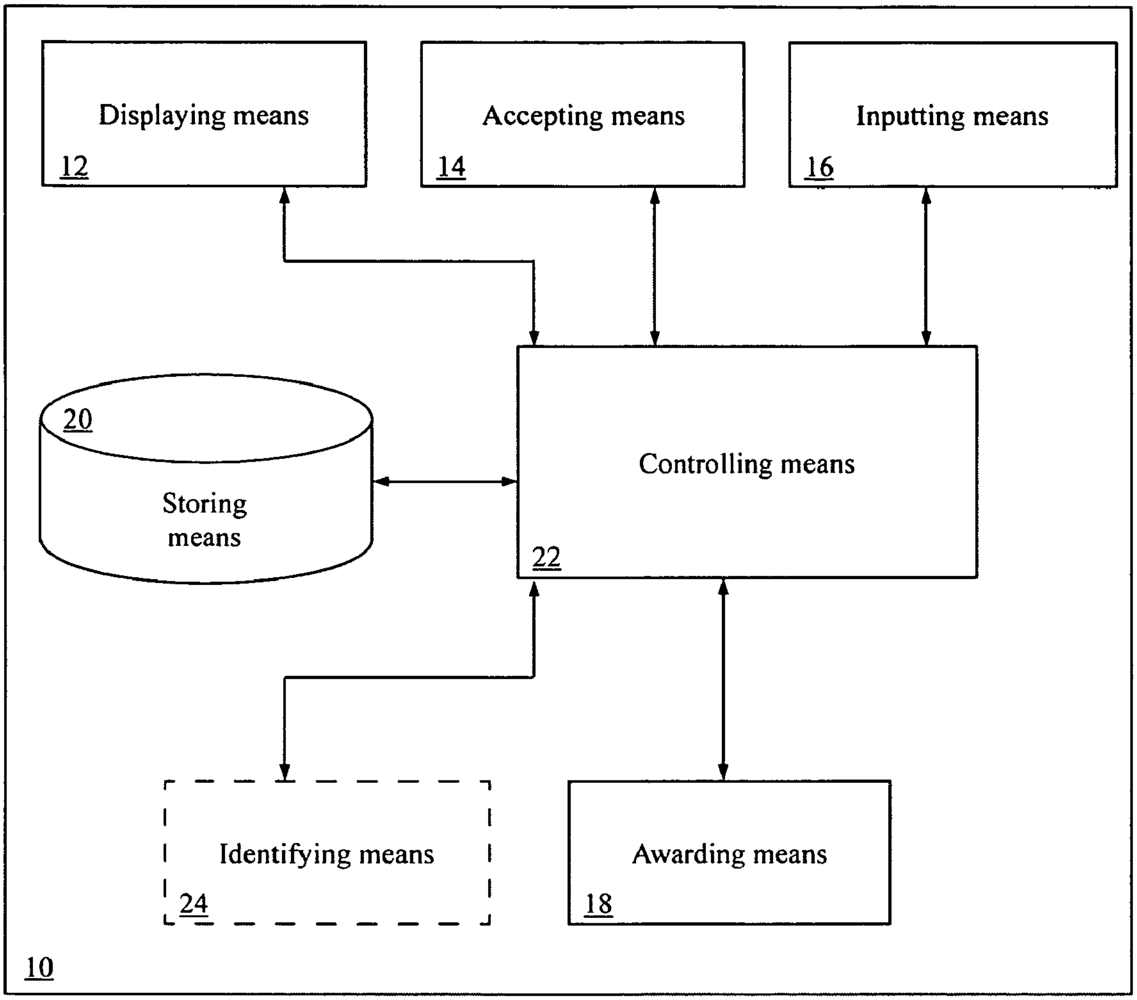
FIG. 2 is a block diagram illustrating components of the gaming machine of FIG. 1.

An embodiment of the present invention is carried out on a gaming machine, as illustrated on FIGS. 1 and 2. The gaming machine 10 comprises displaying means 12, such as a video screen, a LCD screen or mechanical reels; accepting means 14, such as a card reader, or a coin and/or bill acceptor; inputting means 16, such as buttons, levers or a touch screen; awarding means 18, such as a ticket printer, a card reader or a hopper; storing means 20, such as RAM, flash memory, a hard drive or a removable memory medium; and controlling means 22, such as a computer, computer codes, or a hardware controller. The gaming machine 10 further comprises, depending on the embodiments, identifying means 24, such as smart card, voucher printer, and computer codes.

Figure 3:
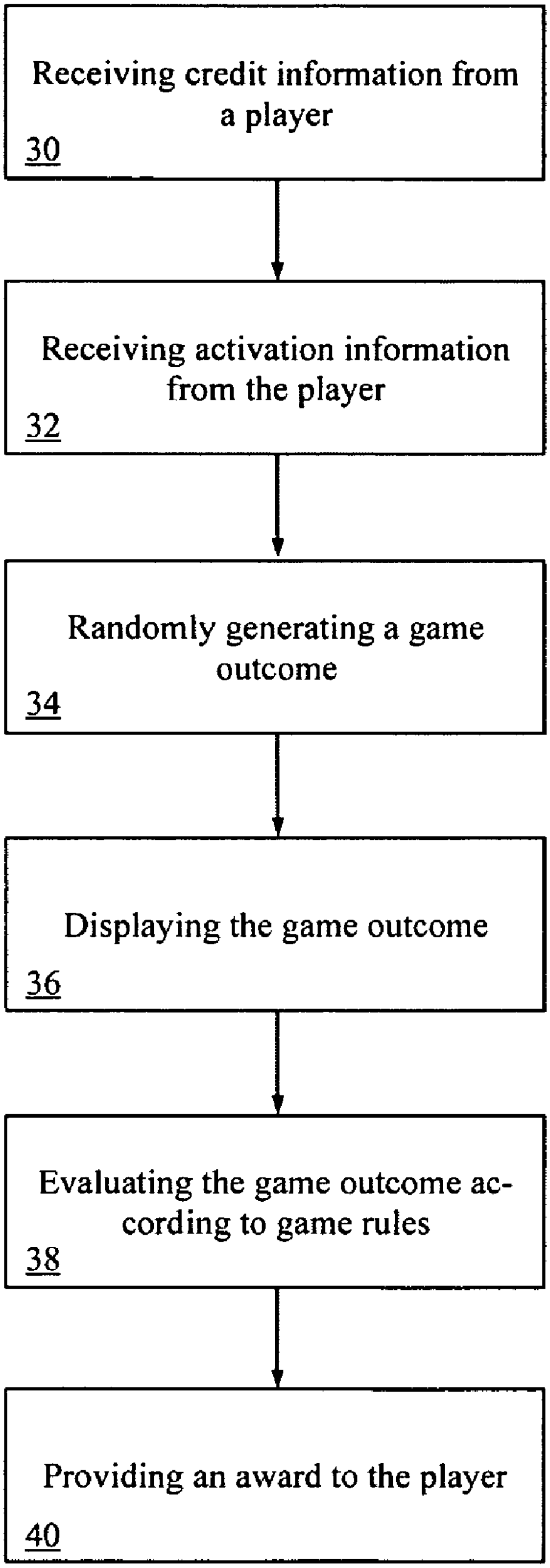
FIG. 3 is a flowchart illustrating the steps performed to provide a primary game on the gaming machine of FIGS. 1 and 2.

Such gaming machine 10 is designed, as shown on FIG. 3, to receive credit information from a player (step 30) either in a physical format (such as coins or bills) or in an electronic format (such as a player card or a money transfer from a bank account), to receive activation information from the player (step 32), to randomly generate (step 34) and display (step 36) a game outcome, to evaluate said game outcome according to game rules (e.g. a pay table) (step 38), and to award a prize to the player for a winning game outcome (step 40).

Figure 4:
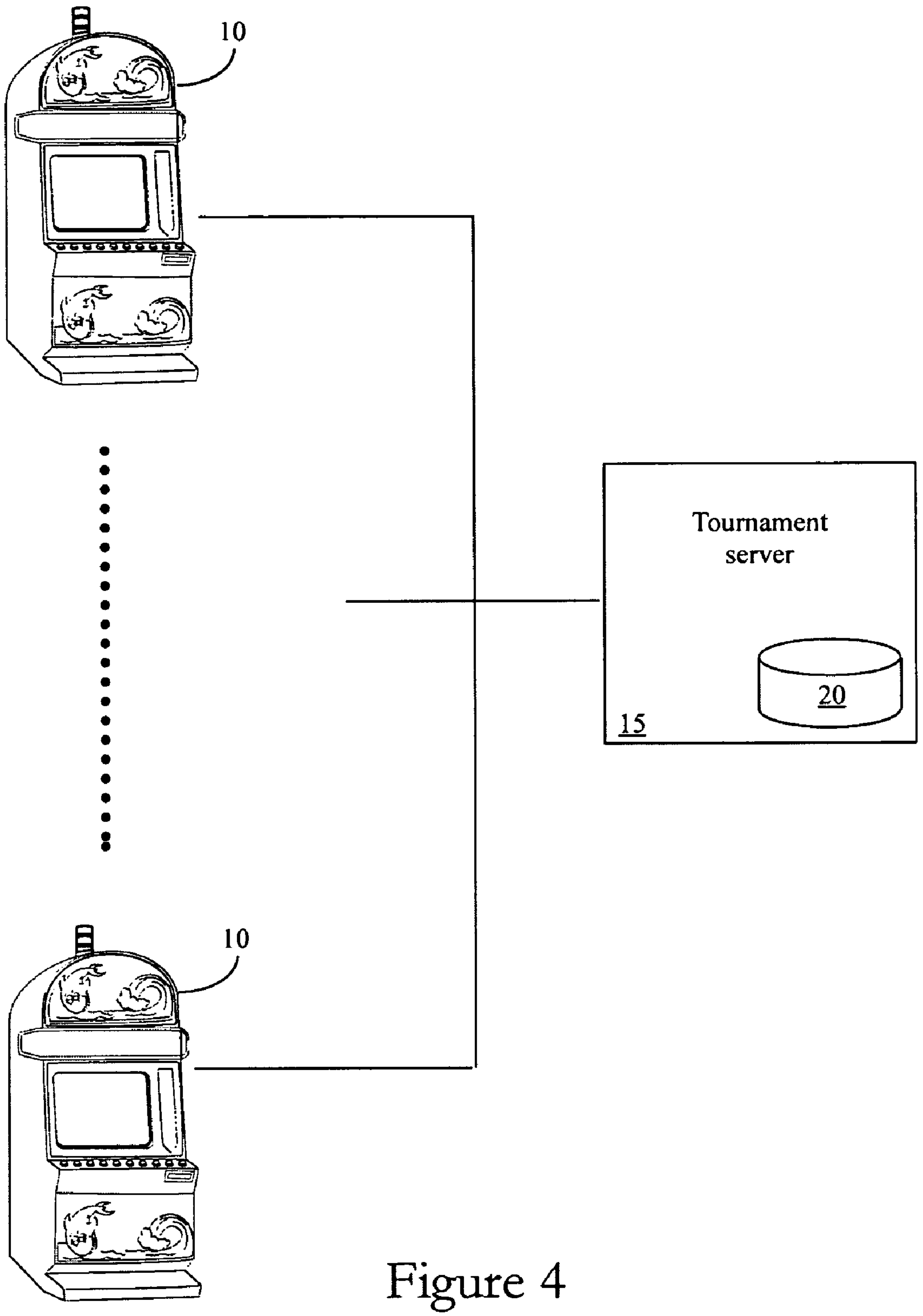
FIG. 4 is a schematic illustration of a network of gaming machines suitable to provide a tournament feature according to one embodiment of the present invention.

Two non-limiting architectures are suitable for embodiments of the present tournament feature: stand-alone gaming machines (illustrated on FIG. 1) and networked gaming machines (illustrated on FIG. 4). The first architecture includes as stated above storing means 20 in the gaming machine 10 in which dynamic data regarding the tournament feature are stored and continually updated. The second architecture (FIG. 4) involves a tournament server 15 communicatively linked with gaming machines 10 offering the tournament feature and also including storing means 20 storing and continually updating data in regard with the present tournament feature. Although these two architectures are physically different, similar functions are performed by components of both architectures with a result of a tournament feature being available on both architectures and respecting the scope of the present tournament feature. Furthermore, the network in one of these architectures may comprise one or more local area networks and even the Internet, suitably managed to provide an embodiment of the tournament feature.

In embodiments of the invention, an asynchronous tournament feature allowing players to asynchronously participate in a tournament feature upon processing of a tournament participation invitation is illustrated. These participations continuously take place until the end of the tournament feature. Upon detection of the end of the feature, an evaluation of scores resulting from these tournament participations is performed in order to determine winning participations and associated awards.

Figure 5:
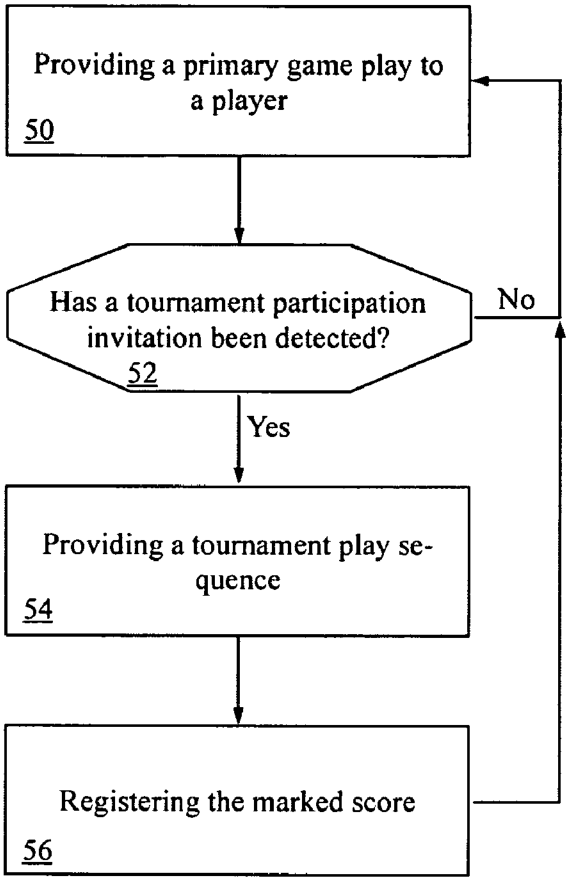
FIG. 5 is a flow chart illustrating steps performed by a gaming machine in an embodiment of the present tournament feature.

FIG. 5 illustrates the steps being performed by a gaming machine providing an asynchronous tournament feature. The steps include providing to a player a play of a primary game to its outcome (step 50), the detection of a tournament participation invitation (step 52), with a negative detection of said invitation resulting in the gaming machine being ready to conduct the primary game (step 50). Upon positive detection of an invitation, a tournament play sequence is initiated and played (step 54) with a score being obtained along the play. When the tournament play sequence ends, the score is registered (storing) (step 56), which can be performed either by the gaming machine or the tournament server either or not in association with a player identifier according to embodiments, followed with the gaming machine returning to its original state (ready to conduct the primary game, thus to perform step 50).

Such embodiments include a gaming machine on which is played a poker game as a primary game. Upon detection of a tournament participation invitation, the player may participate in an asynchronous tournament feature either or not in exchange with a participation fee. In one embodiment, participation is determined by an outside feature, such a monitoring feature and/or random-based feature, determining which of the gaming machines may participate in the tournament feature and when this participation may take place. Determination of eligible gaming machines and non-eligible gaming machines that may or may not participate in the tournament feature may also be performed, the eligibility being determined based on current gaming information, player information, or independently from this information. In another embodiment, participation in the tournament feature is triggered by the occurrence of a particular outcome in the primary game. In a third embodiment, the participation is triggered by the gaming machine independently from any outcome. Depending on the embodiments, any data can be used to determine eligibility for the tournament feature and participation in said feature; for instance game data, cumulative game data, random data, data depending on multiple gaming machines, and a combination of the above. When determination is based on combination of elements, these elements may necessitate concurrent occurrence, or may occur according to predetermined criteria such as within a preset delay (for instance the first event determining a positive eligibility state with the second one triggering the generation of a tournament feature invitation when occurring during a predetermined delay during which the eligibility state remains positive). The selection of the participation- and/or eligibility-deterministic data and the associated criteria is a question of which incentive is to be provided, not feature-related limitations. Moreover, the device(s) generating tournament invitations and determining eligibility are also a question of incentive, and thus not feature-related limitations.

When participating in the tournament feature, the player operating the gaming machine plays a tournament play sequence resulting in the player obtaining a score. At the end of his participation, the score is recorded as a participation in the tournament feature with an identifier associating the player with that score.

A tournament play sequence in one embodiment is a series of plays of modified poker game. Upon initiation of the tournament play sequence, a preset number of plays of a three-hand poker game are played with a modified pay schedule. Modifications in the pay schedule are triggered during the tournament play sequence; the modifications improving the number of points awarded for particular outcomes. Another tournament play sequence involves a line game with specific point schedule, bonuses, and features allowing the player to obtain a score during its play. Another embodiment consists in a combination of games played in a predetermined order or according to a preset process, for instance the occurrence of a trigger event in a first game of the tournament play sequence initiating the play of a second game for the remaining part of the tournament play sequence.

Figure 6:
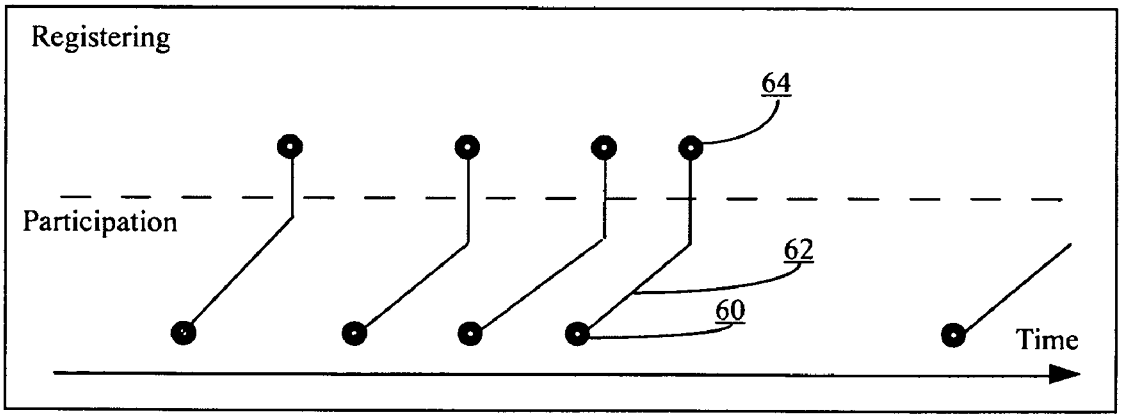
FIG. 6 is a time chart illustrating participations taking place in the tournament feature according to an embodiment.

In the present embodiment, participations continue taking place in the tournament feature up to the end of the tournament feature. Typically, players enter participations regardless of the fact that other players are already having participations taking place, are currently obtaining a score, or taking place into the tournament feature at the time. The process is seamless. FIG. 6 illustrates a timeline wherein tournament feature participations are illustrated for a network embodiment, including participation starting time 60, tournament play sequence 62, and the obtained score starting time 64.

Figure 7:
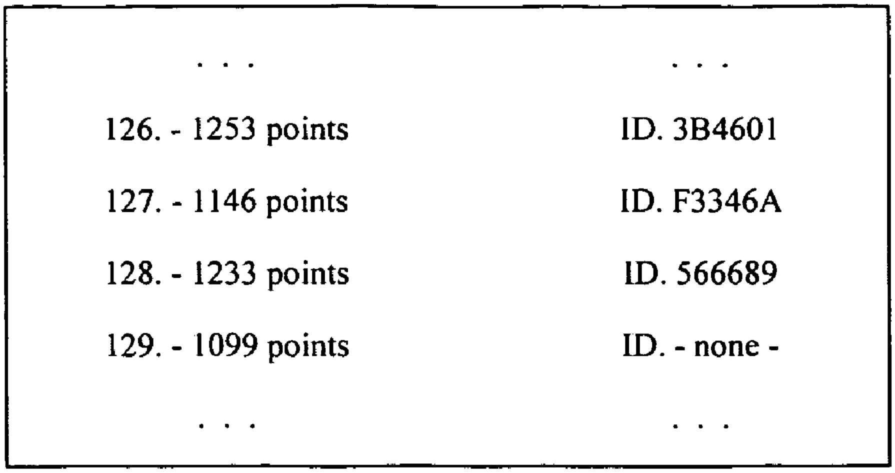
FIG. 7 is a schematic illustration of a suitable score register that is used in an embodiment of the tournament feature.

To associate a score to a player, many solutions exist, with the selection of one solution over another depending on a mix of available hardware and software, cost evaluation, security, and of the desired environment. Available solutions include association of information such as player input data (PIN for instance); of player biometric information; of hardware provided data (player card providing the identifier); or to generate the identifier and store it on a medium such as a smart card or a voucher provided to the player to list a few. The player identifying data is associated with the player score in the storing means that stores tournament data, thereby allowing, at the end of the tournament feature, to identify the player associated with a winning score with or without help of the player. However, for instance when the score is the last one of the tournament feature, or when the player remains on the gaming machine, no identifier may be stored or the identifier may be stored later. FIG. 7 illustrates an example of a tournament score register in which player identifications are associated with scores.

Figure 8:
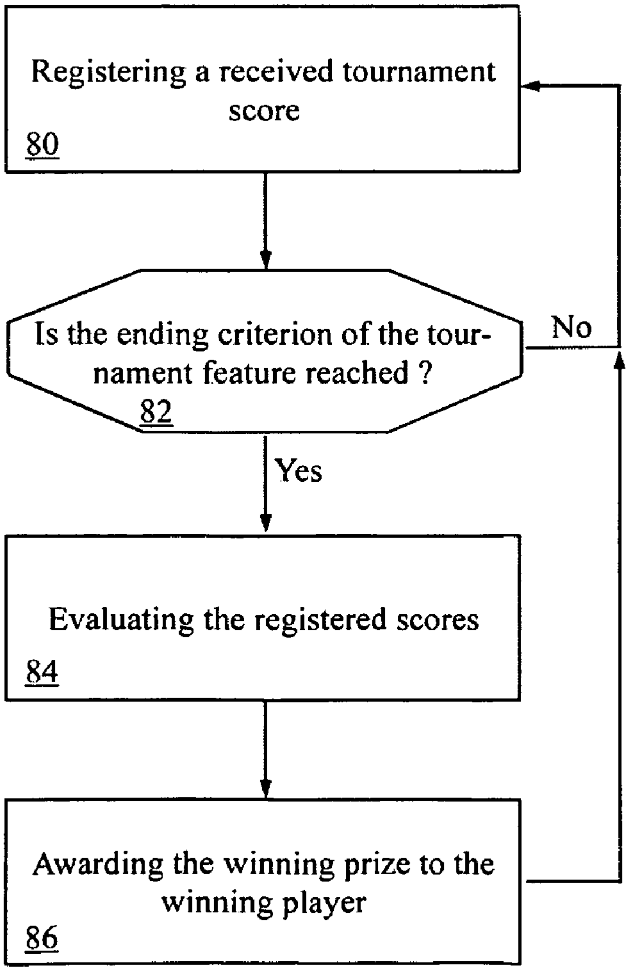
FIG. 8 is a flow chart illustrating steps performed by a tournament server in an embodiment of the tournament feature.

FIG. 8 illustrates the steps performed by the tournament feature in the present embodiment. As the tournament feature is conducted, the tournament server receives and stores scores (step 80). Upon detection of the end of the tournament feature (step 82), evaluation of the stored scores for determination of at least one winning score is performed (step 84); and an award is available to the player who entered a winning score (step 86). Depending on the method used to identify the player to the winning score, it can be necessary for a winning player to monitor tournament outcomes to claim the prize or rather the tournament providing authority may contact the winning player.

The end of the tournament feature may depend on different set factors. For instance, a tournament feature may have a preset duration, a preset number of participations, or a preset or random-based criterion regarding one or a combination of tournament features and/or primary-game based data including the above listed factors.

In another embodiment, invitations and eligibility are monitored in order to provide participations in the tournament feature. In a primary game, a play is performed. Monitoring regarding participation eligibility and invitation statuses is performed. Upon allowing the gaming machine to provide a participation in the tournament feature (for instance by having received an invitation when in a eligible state), an invitation is prompted on the gaming machine screen for the player to participate in the tournament feature, followed with the player playing a tournament play sequence (for free in the present embodiment) through which a tournament score is obtained. At the end of the tournament participation, the score is identified to the player and stored in a tournament register in the appropriate storing means.

In a networked embodiment, the tournament feature is initiated by the tournament server signaling gaming machines to offer participations in the tournament feature. Continuously, tournament ending criterion is monitored while obtained scores are stored in the tournament register as players participate in the tournament feature. When the tournament ending criterion is fulfilled, no more entry can take place in the tournament feature. Then, evaluation of the stored scores is performed, with at least one winner being determined. Finally, each winner is provided with their prize.

The latter embodiment and other embodiments may include further steps as verifying if tournament participations are in process when the ending criterion is fulfilled, and waiting for the scores associated with these participations to be stored to elect a tournament winner. It may further include signaling tournament winning information to gaming machines offering participation in the tournament feature, or on a distinct means for displaying tournament information to be seen by tournament-feature participating and non-participating persons. Another addition may be to prevent initiation of a new tournament feature until a certain criterion is fulfilled, such as all participation scores being received for the present tournament feature.

Another embodiment is a network of gaming machines on which a standard poker game is available for playing. On each gaming machine a monitoring is continuously performed to set eligibility of the gaming machine to provide a participation in the tournament feature, with the result being transmitted to the tournament server. A tournament server communicatively linked to the gaming machines sends, once in a while, a tournament invitation to a randomly elected eligible gaming machine. Accordingly, the player is invited to play a modified poker game (for instance with a modified pay table yielding score points for free). The player plays a maximum of N rounds with P betting points available at the beginning of these rounds with possibility to bet the points won during already played rounds into the next rounds of the tournament game sequence. The player may have limited time to complete the sequence. The player's score is the numbers of points the player has at the end of the play sequence. When the participation is complete, the gaming machine may prompt the player to enter identification, and may send a PIN back the player or a voucher that the player may use to certify his identity in case he wins the tournament feature. The tournament server stores tournament scores until the end of the tournament feature. When the tournament feature ends, the tournament server elects the player who has the best score as the winner. The winner is either contacted or published, the latter requiring the winner to verify himself his status after the end of the tournament feature in order to receive his prize. In the last case, a player identifying himself as the winner contacts the tournament providing authority to be provided his prize.

Based on the last embodiment, available variants include processing all participations in the tournament feature regardless of player participation level (i.e. bet level) in the primary game, the triggering event resulting in the participation, etc. Another variant involves storing the participations in different groups based on such criteria. For example, players playing the primary game at a play level A when invited to participate in the tournament feature would result in the score being stored in a register A, while a player playing at a participation level B would see his score obtained being stored in a register B. Therefore, the latter would result in distinct tournament features having similar characteristics or not.

In an embodiment, the tournament server provides tournament participation invitations without knowing the eligibility status of the signaled gaming machine. In another embodiment, the gaming machines continuously provide either their eligibility status or data to determine their eligibility status to the tournament server, and the tournament server signals tournament participation invitations only to eligible gaming machines.

Depending on the desired results, criteria used to set eligibility of a gaming machine may be based on the player being identified, either through means such a smart card or machine inserted VIP card, or a manually entered identification such a PIN. It may also be based on the play level on the gamine machine, for instance the amount of the last bet placed, the number of plays initiated during a monitoring period (e.g., during the last 5 minutes), the frequency of play initiations (e.g., an average of less than ten seconds between the last four play initiations), or even the time of the last play initiation (e.g. within the last twenty seconds).

In other embodiments, one, two, or more winners may be elected at the end of a tournament feature. Each winner may be awarded a different prize value. Accordingly, a different incentive is created. An example is electing three best scores to be awarded prizes; these players being accordingly awarded 60%, 30% and 10% of a total tournament prize in respect with their score order. Another example is to reward players who obtained extreme scores (highest and lowest). The value of these prizes may be predetermined or may be one or a portion of a progressive prize either or not dedicated to the tournament feature.

In another embodiment, a player participating in the tournament feature may be awarded instant prizes. Accordingly, the value of these prizes and the criteria used to determine if a player is awarded such a prize is a question of incentive and of payout control. For instance, in one such embodiment, the nth player being provided participation in the tournament feature may be awarded a prize based on the score he obtained; the instant prize being awarded as soon as the participation ends. In another embodiment, it may be associated with the first player obtaining a score over a preset threshold.

The value of the prize awarded may be preset, may be taken from a pool dedicated to the tournament feature, or may be taken from a pool shared with another feature such as a random-based progressive jackpot. For instance, the tournament feature winner could be awarded a percentage of the value of a progressive jackpot at the time the tournament feature ends or at the time the winning score was stored.

In one embodiment, a tournament score may depend only on a number of accumulated points the player scored throughout the outcomes obtained during the tournament game sequence. In other embodiments, the score may also depend on the time necessary to complete the tournament game sequence, a play or point betting sequence, or point evolution during the play of the rounds. Example of the latter is to increase scoring weight of the points won as the tournament participation advances; the points won gradually increasing their weight in the score from one time to two times their nominal values. Another is a tournament play sequence with a goal to reach, the score obtained depending on the goal being reached or not, the different intermediary states that were achieved, and the time that was necessary to reach the goal and the intermediary states. Therefore, the variety of games and methods to score points is solely limited by the objective of obtaining a score. Thus, these examples are provided for teaching purposes only.

In different embodiments, the end of a tournament feature may be differently set. As stated earlier, in one embodiment, time or feature duration may be used to determine the end of the tournament feature. In another embodiment, the number of participations may be used to set when the tournament feature ends. In another one, a tallied total score is used to set the tournament feature ending criteria. In these embodiments, these criteria may be predetermined or may depend on random determination setting. Furthermore, the winning prize in these embodiments may also be predetermined or differently set. For instance, it may rather depend on the number of tournament feature participations or on the period the tournament feature lasts. Consequently, any game-related and tournament-related data alone or in combination, randomly set and preset, may be used to determine when the tournament feature ends and/or the winning prize value(s) according to the scope of the invention. Furthermore, the prize awarded to a tournament feature winner may also take different formats such as participation rights to a special feature or event, comps, gifts, etc.

In an embodiment in which at least one gaming machine does not provide players with possibility to autonomously associate a personal identifier (such as a PIN or smartcard-provided data) with their scores, or when anonymous tournament feature participation is available, players may receive a voucher each time they participate in the tournament feature. The voucher bears a unique identifier that may be compared to winner identifier(s) at the end of the tournament. If the voucher identifier matches one winner identifier, the player may claim a prize.

In another embodiment, eligibility is not set at the same level for all players. Accordingly, depending on the bet level of the player, data associated with the player and provided by a player tracking system, game played, conditions in which the tournament feature participation is offered to the player, etc., an eligibility level will be set. Depending on this eligibility level, the player would see a handicap being assigned to his participation in the tournament feature; this handicap influencing the present tournament feature participation process.

Once again, the kind of handicap selected depends more on the desired feature than on feature associated limitations. Examples of applicable handicaps include, tournament play time, tournament initial state settings, game process settings, and score obtaining process settings. These are provided for teaching purposes only.

Another variant of the latter embodiment is to modify the score obtained with a modifying value according to the state in which the initiation of the tournament participation takes place. Accordingly, a participation resulting from an invitation would store an unmodified obtained score while a participation resulting from another situation could be applied a modifying value stored in a stored score that would differ from the score obtained.

Another embodiment consists in an asynchronous tournament feature as described previously in which time is set as the handicap assigned to tournament feature participations. In this embodiment, players participating in the tournament feature are assigned a handicap (i.e., a time), with this handicap depending on participation initiation state, namely the game they were playing, their bet level, and the outcome that triggered generation of the invitation. Accordingly, the player has more or less time to play the tournament game sequence.

In another embodiment, players may either be invited or may manually request participation in the tournament feature. In response to such a manual request, the gaming machine requests an entry fee, and provides tournament participation to the player. For their part, invitation-based participations are fee free. At the end of the tournament feature, tournament feature participations, regardless of having been performed on invitation or not, are compared to elect a winner. In this embodiment, participations are assigned a different handicap depending on whether or not they are performed on invitation. This handicap as stated above may take many forms: a different pay table, enabled/disabled bonuses, different participation duration, different initial points, different point weighting, etc.; or a combination of the above.

Furthermore, in the last embodiment, when identification of participants is required before the initiation of participation, the handicap assigned to a fee-based participant may be based on player identification or may evolve as one participant increases his number of participations.

Another embodiment is a synchronous tournament feature wherein all participants concurrently participate. Thus the winner(s) is known as soon as the tournament feature ends. In this embodiment, players participating in the tournament feature are assigned a handicap with this handicap depending on participation request-related data and/or player identification-related data. For instance, the time to complete the tournament game sequence could vary from one tournament feature participant to another depending on the fee paid to participate in said tournament feature or on invitation being stored for a particular participation.

Figure 9:
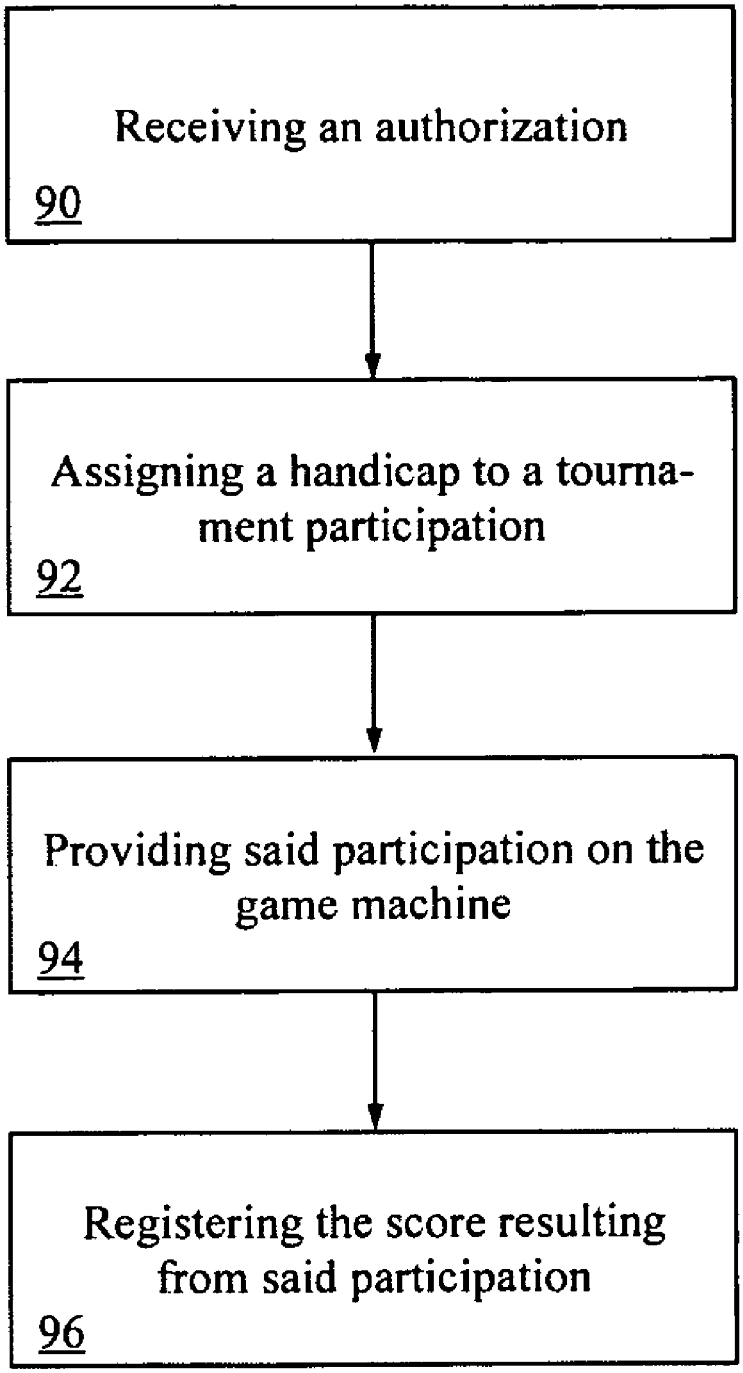
FIG. 9 is a flow chart illustrating steps performed by a game machine in an embodiment of the tournament feature wherein handicaps are assigned to participations in said tournament feature.

FIG. 9 illustrates the latter embodiment, with the method comprising receiving an authorization to participate in the tournament feature on a game machine (step 90); assigning a handicap to a participation (step 92); providing said participation to the player (step 94) through which a score is obtained; and storing the score in a storing means (step 96) with other tournament scores, wherein a winning score may be determined based on the scores stored.

In the latter embodiment, players may participate on game machines dedicated to the tournament feature. For instance, a voucher may be provided to players. They can enter the voucher in the game machine to participate in the tournament feature; the machines responding to it with the conduct of a tournament play sequence on all participating game machines at the same time. In this embodiment, each one of the tournament participations is assigned a handicap. The handicap is transmitted to the game machine through one of a network signal or the voucher. Accordingly, the game machines may either be dedicated to the tournament feature or may be available when not providing tournament participations to play an amusement game for instance.

In such an embodiment, the tournament server may also provide the game machine with data on which will be based on the tournament play sequence. For instance, the tournament server may signal data to each game machine with said data identifying the order of some features potentially occurring during the conduct of the tournament play sequence, or rules to conduct the tournament play sequence.

Other embodiments of synchronous tournament features are available embodying the different features, criteria, variants, etc. that have been disclosed in the present document are possible. For instance, a tournament feature wherein players accumulate tournament feature invitations when playing a primary game with the tournament feature being forecast to start at a preset time. According to the primary game in which the player received the invitation, the participation level when the player received his participation, the number of invitations received, etc. each participation would be assigned a handicap that would influence the associated tournament play sequence, and potentially the score obtained. Furthermore, a player may or may not buy participations in the synchronous tournament feature, the assigned handicap varying for instance according to the buying fee and the moment the participation was bought.

In another embodiment, only fee-based tournament participations may be available. Furthermore, participants may select different participation fees for their participations. According to players' selected fees, different handicaps are assigned to participations in the same tournament feature. Accordingly, depending on strategy, or on desired incentive, players may take different decisions.

In another embodiment, supplementary data is affixed to the participation in addition to identifier, with the affixed data being used to determine the winning value to award to the winner. An example of this embodiment is that the handicap assigned to a participation being stored in combination with the score obtained. When determining the winner, the scores are compared regardless of the handicap experienced by the player when obtaining the score. However, when determining the prize to award to the winner, the handicap is taken into consideration. Therefore, the prize value would potentially vary depending on the handicap from, for instance, a maximum prize to a portion of said maximum prize.

Furthermore, in an embodiment an individual monitoring of participants and modification of the assigned handicap as their number of participations increase may be performed. The handicap modification may also depend on the last scores, for instance to correct unfair advantage a player may have when he experiences the tournament play sequence many times.

Regardless of the embodiments, displaying tournament feature information is possible. Such information may comprise individual participant scores, best scores, tournament lasting information, prizes, rules, special features related to the tournament feature, etc. This information may be available on the gaming machines, or other displaying means as deemed appropriate.

Those skilled in the art may recognize other embodiments and/or methods to provide such functionalities, either through a central distribution of play data to networked gaming machines, a computer program adapted for such an application and performing said application on computers, or program codes broadcasted using a suitable carrier or saved in memory or another storing medium. The program codes are suitable or responsible, when loaded on a computer or a gaming machine, for making the apparatus perform functionalities of the present invention. However, all of such alternatives are intended to be incorporated in the present document through the herein reference.

It will be noted that the above embodiments illustrate different characteristics the current invention may present. Those skilled in the art will recognize that, even if the embodiments of the present document describe these characteristics as part of different embodiments, one could differently use or combine some of these characteristics without departing from the scope of the invention as intended to be set. Furthermore, embodiments may also present other characteristics and/or variations, with such characteristics falling within the scope of the invention, as set forth in the appended claims.

Furthermore, while some of the appended figures illustrate the invention as groups of discrete components, it will be understood by those skilled in the art that the invention may be embodied differently, for instance through a combination of hardware and software components with some components being implemented by a given function or operation of a hardware or software system. The structure illustrated is thus provided for efficiency of teaching embodiments of the invention.

Thereupon, it is the intent through the present document to efficiently teach the invention through embodiments, while the scope of the invention is solely intended to be limited by the appended claims.

The invention claimed is:

1. On a gaming machine on which is played a primary game, a method of providing a tournament feature, discreet from said primary game and in which tournament participation scores, resulting from tournament participations, wherein tournament play sequences are played, are stored throughout conduct of said tournament feature to determine a tournament winning score, the method comprising:

establishing at least two distinct participation states based on at least one of (a) an event in said primary game; (b) play behavior of a player in said primary game; and (c) a status of said gaming machine during play of said primary game establishing at least two distinct handicaps, each associated with at least one participation state; and for each of said tournament participations:

detecting a tournament participation authorization during the conduct of said primary game;

evaluating said tournament participation authorization to determine one of said participation states for said tournament participation;

assigning via the game machine the handicap associated with said determined participation state to said tournament participation, said handicap being applied during the play of said tournament play sequence; and conducting said tournament participation to determine a tournament score, said score depending at least in part on said assigned handicap applied to said tournament play sequence.

2. The method of claim 1, wherein said tournament participation authorization comprises a signal authorizing said game machine to provide said tournament participation.

3. The method of claim 1, wherein said tournament participation authorization results from said player providing a tournament participation fee.

4. The method of claim 1, wherein said tournament participation authorization results from processing of a manually provided medium bearing information reflective of said tournament participation authorization.

5. The method of claim 1, wherein said at least two participation states are evaluated based at least on two of:

said player being provided said tournament participation without additional fee in comparison of playing a game before receiving said tournament participation authorization;

said player having placed a fee to be provided said tournament participation;

said player placing a side bet in said game to be provided said tournament participation;

a first bet level placed by said player to play said game;

a second bet level different from said first bet level placed by said player to play said game;

anonymousness of said player when playing said game on said game machine;

participation of said player in a reward program, with said reward-program participating player being identified on said game machine;

monitoring of a first level of play of said game engaged by said player on said game machine prior to said tournament participation authorization, wherein said first level of play is function of at least a first pace of play of said player when playing said game during a monitoring time period; and monitoring of a second level of play of said game, different from said first level of play of said game, engaged by said player on said game machine prior to said tournament participation authorization, wherein said second level of play is function of at least a second pace of play of said player when playing said game during a monitoring time period.

6. The method of claim 1, further comprising receiving an input from said player, wherein said handicap is established at least based on said input.

7. The method of claim 1, wherein the conduct of said tournament feature allows asynchronous tournament participations in said tournament feature.

8. The method of claim 1, further comprising establishing a time to initiate said tournament participation.

9. The method of claim 1, further comprising communicating said scores to a communicatively linked tournament server on which are stored said scores.

10. The method of claim 1, further comprising determining an eligibility state of said player, wherein determination of a positive eligibility state is necessary to provide one said tournament participation to said player.

11. The method of claim 10, wherein said determination of a positive eligibility state results from at least identification of said player.

12. The method of claim 1, further comprising establishing said score based on at least one of: results obtained during the conduct of said tournament play sequence; and the conduct of said tournament play sequence.

13. The method of claim 1, wherein said handicap influences at least one of: an initial state for the conduct of said tournament play sequence; the conduct of said tournament play sequence, and process used to obtain said score during the conduct of said tournament play sequence.

14. The method of claim 1, further comprising associating an identifier with said score through at least one of:

generating said identifier and providing said identifier to the player in at least one of an informal format and a medium-borne format;

receiving electronic data either associated with said player or from said player, with determination of said identifier being based on said received data; and receiving biometric data from said player, with determination of said identifier being based on said biometric data.

15. The method of claim 14, further comprising at least one of: storing said score with its associated identifier; and communicating said score with its associated identifier to a communicatively linked game server storing said scores with associated identifiers.

16. The method of claim 15, further comprising awarding an instant prize to said player based on said tournament participation.

17. The method of claim 1, wherein a game played during the conduct of said tournament play sequence comprises one of: poker; blackjack; keno; bingo; line game; strategy game; and skill game.

18. A game machine for providing a primary game and a tournament feature discreet from said primary game in which scores resulting from tournament participations wherein tournament sequences are played are stored throughout conduct of said tournament feature and in which, upon or after ending of the conduct of said tournament feature, said scores are evaluated to determine a winning score for awarding a prize to a player, the game machine comprising:

displaying means for displaying contents associated with said primary game and said tournament feature;

inputting means for a player inputting commands;

storing means for storing tournament feature data; and controlling means for controlling said tournament participations comprising:

conduct of a tournament play sequence upon reception, during conduct of said primary game, of a tournament participation authorization;

evaluation of said tournament participation authorization to determine one of at least two distinct participation states, said at least two participation states being established based on at least one of (a) an event in said primary game; (b) play behavior of a player in said primary game; and (c) a status of said game machine during play of said primary game;

assignment of one of at least two distinct a handicaps to said one of said tournament participations, said at least two distinct handicaps being each associated with at least one of said participation states said handicap being applied during the play of said tournament play sequence; and determination of a score according to the conduct of said tournament play sequence, said score depending at least in part on said assigned handicap applied to said tournament play sequence.

19. The gaming machine of claim 18, wherein said at least two participation states evaluated by said controlling means are evaluated based at least on two of:

said player being provided said tournament participation without additional fee in comparison of playing a game before receiving said tournament participation authorization;

said player having placed a fee to be provided said tournament participation;

said player placing a side bet in said game to be provided said tournament participation;

a first bet level placed by said player to play said game;

a second bet level different from said first bet level placed by said player to play said game;

anonymousness of said player when playing said game on said game machine;

participation of said player in a reward program, with said reward-program participating player being identified on said game machine;

monitoring of a first level of play of said game engaged by said player on said game machine prior to said tournament participation authorization, wherein said first level of play is function of at least a first pace of play of said player when playing said game during a monitoring time period; and monitoring of a second level of play of said game, different from said first level of play of said game, engaged by said player on said game machine prior to said tournament participation authorization, wherein said second level of play is function of at least a second pace of play of said player when playing said game during a monitoring time period.

20. The game machine of claim 18, further comprising identifying means for identifying said scores with an identifier allowing identification of the player who obtained said score once stored.

21. The game machine of claim 18, further comprising communicating means for at least one of communicating to and receiving from a device involved in providing said tournament feature tournament-feature related data.

22. The game machine of claim 18, further comprising receiving means for receiving at least one of:

a fee from a player; and data representative of one said tournament feature authorization, with one said tournament feature authorization resulting from said fee or data being received.

23. A method of providing a tournament feature played along a primary game and in which scores resulting from tournament participations on at least one game machine are stored throughout conduct of said tournament feature and in which, upon or after ending of the conduct of said tournament feature, said scores are evaluated to determine a winning score for awarding a prize to a player, the method comprising:

storing scores obtained on a player-operated game machine during conduct of a tournament play sequence;

assigning via the game machine a handicap to said tournament play sequence before or upon initiation of said tournament play sequence with said handicap influencing said score resulting from said tournament play sequence whose assigned said handicap, wherein said handicap is established after evaluating at least one participation state associated with said tournament play sequence to be initiated, said handicap being established at least based on said evaluated participation state among at least two distinct participation states, and said participation state being based on events occurring during play of said primary game; and upon or after determination of the conduct of said tournament feature having ended, evaluating the stored scores to establish said winning score.

24. The method of claim 23, further comprising identifying said score with an identifier.

25. The method of claim 23, further comprising generating a tournament participation authorization, wherein process of said tournament invitation authorization on one of said at least one game machine initiates the conduct of one said tournament play sequence on said game machine.

26. The method of claim 25, wherein said tournament participation authorization is generated upon reception of a participation fee from a player.

27. . The method of claim 25, further comprising communicating said tournament participation authorization to one of said at least one game machine.

28. The method of claim 25, further comprising providing to a player in one of a game-machine readable format and an informal format said tournament participation authorization.

29. The method of claim 23, further comprising receiving said scores from said at least one game machine.

30. The method of claim 23, further comprising determining when said tournament feature ends based on monitored activity on at least one of said at least one game machine.

31. The method of claim 30, wherein said activity monitoring is based on at least one of: activity related to the conduct of an individual tournament play sequence; and cumulative activity related to the conduct of said tournament feature.

32. The method of claim 23, wherein said at least two participation states are evaluated based at least on two of:

said player being provided said tournament participation without additional fee in comparison of playing a game before receiving said tournament participation authorization;

said player having placed a fee to be provided said tournament participation;

said player placing a side bet in said game to be provided said tournament participation;

a first bet level placed by said player to play said game;

a second bet level different from said first bet level placed by said player to play said game;

anonymousness of said player when playing said game on said game machine;

participation of said player in a reward program, with said reward-program participating player being identified on said game machine;

monitoring of a first level of play of said game engaged by said player on said game machine prior to said tournament participation authorization, wherein said first level of play is function of at least a first pace of play of said player when playing said game during a monitoring time period; and monitoring of a second level of play of said game, different from said first level of play of said game, engaged by said player on said game machine prior to said tournament participation authorization, wherein said second level of play is function of at least a second pace of play of said player when playing said game during a monitoring time period.

33. The method of claim 23, further comprising receiving a participation fee from said player, wherein said handicap is at least-based on said participation fee.

34. The method of claim 23, wherein said handicap influences at least one of: an initial state for the conduct of said tournament play sequence; the conduct of said tournament play sequence; and process used to obtain said score during the conduct of said tournament play sequence.

35. The method of claim 23, further comprising establishing an instant prize to be awarded to said player based on at least one score obtained through at least one of said tournament participations that is provided to said player.

36. The method of claim 23, wherein a game played during the conduct of said tournament play sequence comprises one of: poker; blackjack; keno; bingo; line game; strategy game; and skill game.

37. The method of claim 23, further comprising communicating at least part of data allowing the conduct of said tournament play sequence on said at least one game machine.

38. The method of claim 23, further comprising determining value of said prize based on at least one of: preset data; tournament feature participation data; and a feature different from said tournament feature, said different feature providing prize value data.

39. The method of claim 23, further comprising communicating tournament-feature related information to at least one communicatively linked device, said device displaying said tournament-feature related information.

40. A method of providing a tournament feature in which scores resulting from tournament participations on at least one player-operated game machine, on which is, also played a primary game, are stored throughout conduct of said tournament feature and in which, upon or after ending of the conduct of said tournament feature, said scores are evaluated to determine a winning score for awarding a prize to a player, the method comprising:

during conduct of said primary game, generating a tournament participation authorization for one said player to participate in said tournament feature;

evaluating said tournament participation authorization to determine one of at least two distinct participation states for said tournament participation, said at least two distinct participation states being established based on at least one of (a) an event in said primary game; (b) play behavior of a player in said primary game; and (c) a status of said game machine;

assigning via the game machine one of at least two distinct handicaps to said tournament participation to be provided in said tournament feature, said at least two distinct handicaps being associated with at least one of said participation states; and providing said tournament participation authorization and said assigned handicap in a suitable format for one of said at least one game machine to provide said tournament participation to said player to determine a score, said score depending at least in part on said assigned handicap.

41. The method of claim 40, wherein said at least two participation states are evaluated based at least on two of:

said player being provided said tournament participation without additional fee in comparison of playing a game before receiving said tournament participation authorization;

said player having placed a fee to be provided said tournament participation;

said player placing a side bet in said game to be provided said tournament participation;

a first bet level placed by said player to play said game;

a second bet level different from said first bet level placed by said player to play said game;

anonymousness of said player when playing said game on said game machine;

participation of said player in a reward program, with said reward-program participating player being identified on said game machine;

monitoring of a first level of play of said game engaged by said player on said game machine prior to said tournament participation authorization, wherein said first level of play is function of at least a first pace of play of said player when playing said game during a monitoring time period; and monitoring of a second level of play of said game, different from said first level of play of said game, engaged by said player on said game machine prior to said tournament participation authorization, wherein said second level of play is function of at least a second pace of play of said player when playing said game during a monitoring time period.

42. A method of providing a tournament feature played along with a primary game, and in which scores resulting from tournament participations on at least one player-operated game machine are stored throughout conduct of said tournament feature and in which, upon or after ending of the conduct of said tournament feature, said scores are evaluated to determine a winning score for awarding a prize to a player, the method comprising:

receiving a tournament participation authorization for a player to participate in said tournament feature;

evaluating at least one participation state associated with said tournament-participation authorization, said participation state being based on events occurring during play of said primary game;

assigning via the game machine a handicap to one said tournament participation to be provided in said tournament feature in result of said receiving of said tournament participation authorization, wherein said handicap is established at least based on said evaluated participation state among at least two distinct participation states resulting in assignment of at least two distinct handicaps;

providing said player on one of said at least one game machine with said tournament participation comprising a tournament play sequence influenced by said assigned handicap depending on which a tournament score is marked;

storing said score in storing means with a plurality of said scores;

upon or after detection of the conduct of said tournament feature having ended, evaluating stored scores to establish said winning score; and awarding said prize to said player.

43. The method of claim 42, further comprising identifying each of said scores with an identifier, whereby allowing determination of the player who obtained said winning score once stored.

44. The method of claim 42, further comprising establishing value of said prize based on a value provided by a device different from said game machine.

45. The method of claim 42, wherein one said tournament participation authorization is provided upon reception of a participation fee from one said player.

46. The method of claim 42, wherein said tournament participation authorization is provided in one of a game-machine readable format and an informal format to said player, with said player providing said tournament participation authorization to one of said at least one game machine initiating said tournament participation.

47. The method of claim 42, wherein the conduct of said tournament feature allows asynchronous tournament participations.

48. The method of claim 42, wherein said handicap influences at least one of: an initial state for said tournament participation to be performed; performance of said tournament participation; and process used to obtain said score during performance of said tournament participation.

49. The method of claim 42, wherein said at least two participation states are evaluated based at least on two of:

said player being provided said tournament participation without additional fee in comparison of playing a game before receiving said tournament participation authorization;

said player having placed a fee to be provided said tournament participation;

said player placing a side bet in said game to be provided said tournament participation;

a first bet level placed by said player to play said game;

a second bet level different from said first bet level placed by said player to play said game;

anonymousness of said player when playing said game on said game machine;

participation of said player in a reward program, with said reward-program participating player being identified on said game machine;

monitoring of a first level of play of said game engaged by said player on said game machine prior to said tournament participation authorization, wherein said first level of play is function of at least a first pace of play of said player when playing said game during a monitoring time period; and monitoring of a second level of play of said game, different from said first level of play of said game, engaged by said player on said game machine prior to said tournament participation authorization, wherein said second level of play is function of at least a second pace of play of said player when playing said game during a monitoring time period.

50. Computer codes, stored on a non-transitory suitable medium, adapted to provide a primary game and a tournament feature in which scores resulting from tournament participations on at least one game machine are stored throughout conduct of said tournament feature and in which, upon or after ending of the conduct of said tournament feature, said scores are evaluated to determine a winning score for awarding a prize to a player, said computer codes being adapted to perform at least one of:

a) receiving a tournament participation authorization for a player to participate in said tournament feature;

evaluating at least one participation state based on events occurring during play of said primary game and associated with said tournament participation authorization;

assigning a handicap to one said tournament participation to be provided in said tournament feature in result of said receiving of said tournament participation authorization, wherein said handicap is established at least based on said evaluated participation state among at least two distinct participation states resulting in assignment of at least two distinct handicaps; and providing said player on one of said at least one game machine with said tournament participation comprising conduct of a tournament play sequence depending on which a tournament score is obtained, wherein said tournament score depends in part on said handicap assigned to said tournament participation, b) storing scores obtained on said at least one player-operated game machine through conduct of one said tournament play sequence being assigned one said handicap before or upon its initiation; and upon or after determination of the conduct of said tournament feature having ended, evaluating the stored scores to establish said winning score, wherein said handicap is established at least according to an evaluated participation state among at least two distinct participation states resulting in assignment of at least two distinct handicaps, said participation states being based on events occurring during play of said primary game and c) generating one said tournament participation authorization for one said player to participate in said tournament feature;

evaluating at least one participation state associated with said tournament participation authorization, said participation state being based on events occurring during the play of said primary game;

assigning a handicap to one said tournament participation to be provided in said tournament feature in result of said receiving of said tournament participation authorization, wherein said handicap is established at least based on said evaluated participation state among at least two distinct participation states resulting in assignment of at least two distinct handicaps; and providing said tournament participation authorization and said assigned handicap in one suitable format for one of said at least one game machine to provide said tournament participation to said player, wherein said tournament score depends in part on said handicap assigned to said tournament participation.

51. The computer codes of claim 50, wherein said at least two participation states evaluated when performing anyone of said a), said b) or said c) are evaluated based at least on two of:

said player being provided said tournament participation without additional fee in comparison of playing a game played before receiving said tournament participation authorization;

said player having placed a fee to be provided said tournament participation;

said player placing a side bet in said game to be provided said tournament participation;

a first bet level placed by said player to play said game;

a second bet level different from said first bet level placed by said player to play said game;

anonymity of said player when playing said game on said game machine;

participation of said player in a reward program, with said reward-program participating player being identified on said game machine;

monitoring of a first level of play of said game engaged by said player on said game machine prior to said tournament participation authorization, wherein said first level of play is function of at least a first pace of play of said player when playing said game during a monitoring time period; and monitoring of a second level of play of said game, different from said first level of play of said game, engaged by said player on said game machine prior to said tournament participation authorization, wherein said second level of play is function of at least a second pace of play of said player when playing said game during a monitoring time period.

* * * * *